(12) United States Patent
Remseth et al.

(10) Patent No.: US 12,393,724 B2
(45) Date of Patent: Aug. 19, 2025

(54) PRIVACY AWARE SOURCE CODE

(71) Applicant: Microsoft Technology Licensing, LLC, Redmond, WA (US)

(72) Inventors: Bjorn Gunnar Remseth, Viken (NO); Haiyue Chen, Oslo (NO); Nico Reißmann, Trondheim (NO); Arve Aleksander Nymo Skogvold, Trondheim (NO)

(73) Assignee: Microsoft Technology Licensing, LLC

( * ) Notice: Subject to any disclaimer, the term of this patent is extended or adjusted under 35 U.S.C. 154(b) by 333 days.

(21) Appl. No.: 18/048,953

(22) Filed: Oct. 24, 2022

(65) Prior Publication Data
US 2024/0135030 A1 Apr. 25, 2024
US 2024/0232424 A9 Jul. 11, 2024

(51) Int. Cl.
*G06F 21/62* (2013.01)

(52) U.S. Cl.
CPC .................. *G06F 21/6245* (2013.01)

(58) Field of Classification Search
CPC ................................. G06F 21/6245
See application file for complete search history.

(56) References Cited

U.S. PATENT DOCUMENTS

| | | | |
|---|---|---|---|
| 10,180,836 B1* | 1/2019 | Arguelles | G06F 8/75 |
| 10,635,434 B2 | 4/2020 | Greer | |
| 11,182,490 B2 | 11/2021 | Allen et al. | |
| 11,941,156 B1* | 3/2024 | Kats | H04L 63/102 |
| 11,973,784 B1* | 4/2024 | Erlingsson | G06F 9/5077 |
| 12,058,160 B1* | 8/2024 | Erlingsson | G06F 16/906 |
| 12,093,414 B1* | 9/2024 | Munoz | G06F 21/6218 |
| 12,126,643 B1* | 10/2024 | Skarphedinsson | G06F 21/552 |
| 2019/0213355 A1* | 7/2019 | Raviv | G06F 16/901 |
| 2021/0011919 A1 | 1/2021 | Lu et al. | |
| 2022/0229856 A1* | 7/2022 | Malhotra | G06F 21/577 |
| 2023/0161585 A1* | 5/2023 | Medeiros Destro | G06F 8/73 717/123 |
| 2023/0305813 A1* | 9/2023 | Jalal | G06F 9/455 |

(Continued)

FOREIGN PATENT DOCUMENTS

CN 111709052 B 5/2021

OTHER PUBLICATIONS

Jaager, et al., "PrivaLog: A Privacy-Aware Logic Programming Language", In Repository of arXiv:2010.07057v2, May 17, 2021, 41 Pages.

(Continued)

*Primary Examiner* — Stephen T Gundry

(57) ABSTRACT

Systems and methods for protecting privacy-relevant data from unauthorized disclosure in source code of an application. For instance, the present disclosure provides a plurality of technical features including: a privacy-relevant data analyzer that analyzes source code, detects privacy-relevant data in the source code, and generates a report of instances of detected privacy-relevant data. In some examples, the privacy-relevant data analyzer scans through source code to detect annotations that denote if fields, records, or combinations thereof include privacy-relevant data. The privacy-relevant data analyzer further generates and provides a report of detected privacy issues associated with sensitive data included in source code so that the issues can be resolved to ensure that privacy is not breached.

20 Claims, 15 Drawing Sheets

(56) References Cited

U.S. PATENT DOCUMENTS

| | | | | |
|---|---|---|---|---|
| 2024/0078096 A1* | 3/2024 | Gass | ................... | G06F 8/65 |
| 2024/0078336 A1* | 3/2024 | Sansom | ................ | G06F 8/77 |
| 2024/0086570 A1* | 3/2024 | Sharma | ............... | G06F 21/6245 |
| 2024/0095027 A1* | 3/2024 | Fanning | ................ | G06F 8/77 |
| 2024/0135030 A1* | 4/2024 | Remseth | ............ | G06F 21/6245 |
| 2024/0135477 A1* | 4/2024 | Fron | ................... | G06F 21/54 |
| 2024/0211232 A1* | 6/2024 | Gass | ................... | G06F 8/40 |
| 2024/0242158 A1* | 7/2024 | Hora | ................... | G06Q 10/105 |
| 2024/0256254 A1* | 8/2024 | Gass | ................... | G06F 8/65 |
| 2024/0311476 A1* | 9/2024 | Cohen | ................. | G06F 21/53 |
| 2024/0345993 A1* | 10/2024 | Madisetti | ............. | G06F 16/176 |
| 2024/0354408 A1* | 10/2024 | Mooney, III | .......... | G06F 21/563 |

OTHER PUBLICATIONS

Jelínek, Vojěch, "Privacy Aware Programming", Retrieved from: https://github.com/oppia/oppia/wiki/Privacy-aware-programming, Oct. 15, 2021, 8 Pages.

Li, et al., "Honeysuckle: Annotation-Guided Code Generation of In-App Privacy Notices", In Proceedings of the ACM on Interactive, Mobile, Wearable and Ubiquitous Technologies, Sep. 14, 2021, 27 Pages.

* cited by examiner

FIG. 3

```
1   namespace TodoApi.Models
2   {
3       public class TodoItemDTO
4       {
5           [EUPI]
6           public long Id { get; set; }
7           [EUII]
8           public string? Name { get; set; }
9
10          public bool IsComplete { get; set; }
11
12      }
13  }
```

DATA TYPE 304

306a
306b

ANNOTATION 302a
ANNOTATION 302b

300

CODE EDITOR 202

UI 206

```
namespace TodoApi.Controllers
{
    [Route("api/[controller]")]
    [ApiController]
    public class TodoItemsController : ControllerBase
    {
        private readonly TodoContext _context;

public TodoItemsController(ToDoContext context)
        {
            _context = context;
        }
        //GET: api/TodoItems
        [HttpGet]
        public async Task<ActionResult<IEnumerable<TodoItemDTO>> GetToDoItems()
        {
            return await _controller.TodoItems
                .Select(x => ItemToDTO(X))
                .ToListAsync();
        }

//GET: api/TodoItems/5
        [HttpGet("(id)")]
        public async Task<ActionResult<TodoItemDTO>> GetTo
```

CODE EDITOR 202

UI 206

```
private readonly ToDoContext _context;

public TodoItemsController(ToDoContext context)
{
    _context = context;
}
//GET: api/TodoItems
[HttpGet]
public async Task<ActionResult<IEnumerable<TodoItemDTO>>> GetToDoItems()
{
    return await _context.TodoItems
        .Select(x => ItemToDTO(x))
        .ToListAsync();
}

//GET: api/TodoItems/5
[HttpGet("{id}")]
public async Task<ActionResult<TodoItemDTO> public async Task<ActionResult<TodoIte
{
    var todoItem = await _context.TodoIte
    if (todoItem == null)
    {
        return NotFound();
    }
```

402

304

404 — "TodoItemDTO" includes end user identifiable information. This API endpoint will expose a derivative of that information as a result.

406a — Mark this endpoint as requiring special privacy review

406b — Supress or configure issues ▶

CODE EDITOR 202

```
private readonly TodoContext _context;

public TodoItemsController(ToDoContext context)
{
    _context = context;
}

// GET: api/TodoItems
/// <Privacy>
/// This Endpoint requires special privacy review.
/// Fill out or view existing applications at https:EndpointPrivacy.com/123
/// </Privacy>
[HttpGet]
public async Task<ActionResult<IEnumerable<TodoItemDTO>>> GetToDoItems()
{
    return await _context.TodoItems
        .Select(x => ItemToDTO(X))
        .ToListAsync();
}

//GET: api/TodoItems/5
[HttpGet("{id}")]
public async Task<ActionResult<TodoItemDTO>> GetTo
{
    var todoItem = await _context.TodoItems.FindAs
```

COMMENT 408 — 304 (TodoItemDTO)

CODE EDITOR 202

UI 206

```
private readonly TodoContext _context;

public TodoItemsController(ToDoContext context)
{
    _context = context;
}
//GET: api/TodoItems
[HttpGet]
public async Task<ActionResult<IEnumerable<TodoItemDTO>>> GetToDoItems()
{
    return await _context.TodoItems
        .Select(x => ItemToDTO(x))
        .ToListAsync();
}

//GET: api/TodoItems/5
[HttpGet("(id
public async
    var todo
    if (todoItem == null)
    {
        return NotFound();
```

400

304

404 — "TodoItemDTO" includes end user identifiable information. This API endpoint will expose a derivative of that information as a result.

406a — Mark this endpoint as requiring special privacy review

406b — Supress or configure issues ▶

410a — Suppress in source

410b — Configure severity for analyzers

```
CODE EDITOR 202

UI 206 private readonly TodoContext _context;

public TodoItemsController(ToDoContext context)
{
    _context = context;
}
// GET: api/TodoItems
                            JUSTIFICATION 412
[assembly: SuppressPrivacyWarning(
    "Usage",
    "PA0001: Endpoint contains end user identifiable information. This API
    endpoint will expose a derivative of that information as a result.",
    Justification = "This is a misclassification, TodoItems does NOT
    contain EUII",
    Alias = "UserA",
    Target = "~P:TodoApi.TodoApi.Controllers.TodoItemsController.GetTodoItems")]

[HttpGet]
public async Task<ActionResult<IEnumerable<TodoItemDTO>>> GetToDoItems()
                                                    304
{
    return await _context.TodoItems
        .Select(x => ItemToDTO(X))
        .ToListAsync();
}
```

FIG. 4E

PRIVACY AWARE SOURCE CODE

BACKGROUND

Source code for an application can include and/or process sensitive data, such as Personally Identifiable Information (PII), attorney-client privileged information, Protected Health Information (PHI), or other information that an individual or enterprise wants to keep from unauthorized disclosure. For instance, sensitive data, if stolen, inadvertently shared, or exposed through a breach, can expose the individual and/or enterprise to various risks (e.g., identity theft or other crimes, embarrassment). As such, sensitive data included in or processed by an application needs to be protected, such as from unauthorized disclosure.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for protecting sensitive data. Data privacy is a concern when sensitive data, such as Personally Identifiable Information (PII), attorney-client privileged information, Protected Health Information (PHI), or other information that an individual or enterprise wants to keep from unauthorized disclosure is collected, stored, used, or otherwise processed in digital form. A challenge involving data privacy is to utilize data while protecting an individual and/or enterprise's privacy preferences/policies related to sensitive information. Sensitive data that is protected from unauthorized disclosure is herein referred to as privacy-relevant data. Examples of the present disclosure include a privacy-relevant data analyzer that analyzes source code, detects privacy-relevant data in the source code, and generates a report of instances of detected privacy-relevant data. In some examples, the privacy-relevant data analyzer scans through source code to detect annotations that denote if fields, records, or combinations thereof include privacy-relevant data. The privacy-relevant data analyzer further generates and provides a report of detected privacy issues associated with sensitive data included in source code so that the issues can be resolved to ensure that privacy is not breached.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 3 is an illustration of example source code including privacy-relevant data according to an example;

FIG. 4A is an illustration of an example user interface as may be displayed during writing or editing source code according to an example;

FIG. 4B is an illustration of an example notification as may be displayed in the example user interface based on an identified privacy-relevant data issue according to an example;

FIG. 4C is an illustration of an example comment as may be added to the source code and displayed in the example user interface according to an example;

FIG. 4D is an illustration of example sub-actions as may be displayed in the example user interface according to an example;

FIG. 4E is an illustration of an example justification for suppressing a notification about a privacy-relevant data issue according to an example;

DETAILED DESCRIPTION

A software application's complexity can increase very quickly as the application is developed or updated. A codebase, for example, can span tens of thousands of lines of code, or more. It often becomes increasingly difficult to detect deficiencies such as privacy breaches, logic errors, security vulnerabilities, overlooked input possibilities, and even some typographical errors in the program or its underlying source code. Some errors, such as misspelled names or missing parentheses, may be caught by a compiler, but other deficiencies are not detected by compilers. For instance, the compiler will not catch a coding error that results in the application breaching privacy of sensitive data.

As such, examples described in this disclosure relate to systems and methods for protecting privacy-relevant data from unauthorized disclosure in source code of an application. For instance, the present disclosure provides a plurality of technical features including: a privacy-relevant data analyzer that analyzes source code, detects privacy-relevant data in the source code, and generates a report of instances of detected privacy-relevant data. In some examples, the privacy-relevant data analyzer scans through source code to detect annotations that denote if fields, records, or combinations thereof include privacy-relevant data. The privacy-relevant data analyzer further generates and provides a report of detected privacy issues associated with sensitive data included in source code so that the issues can be resolved to ensure that privacy is not breached.

According to examples, the privacy-relevant data analyzer improves data security by reducing coding errors that breach privacy of sensitive data. Moreover, annotations enrich data type descriptions with elements of a privacy taxonomy, allowing for scanning through vast amounts of source code data in memory efficiently, for example, with minimal runtime cost using machine-based reasoning. Thus, less memory space is required, processor load is reduced, and processing speed is increased, among other benefits.

Figure 1:
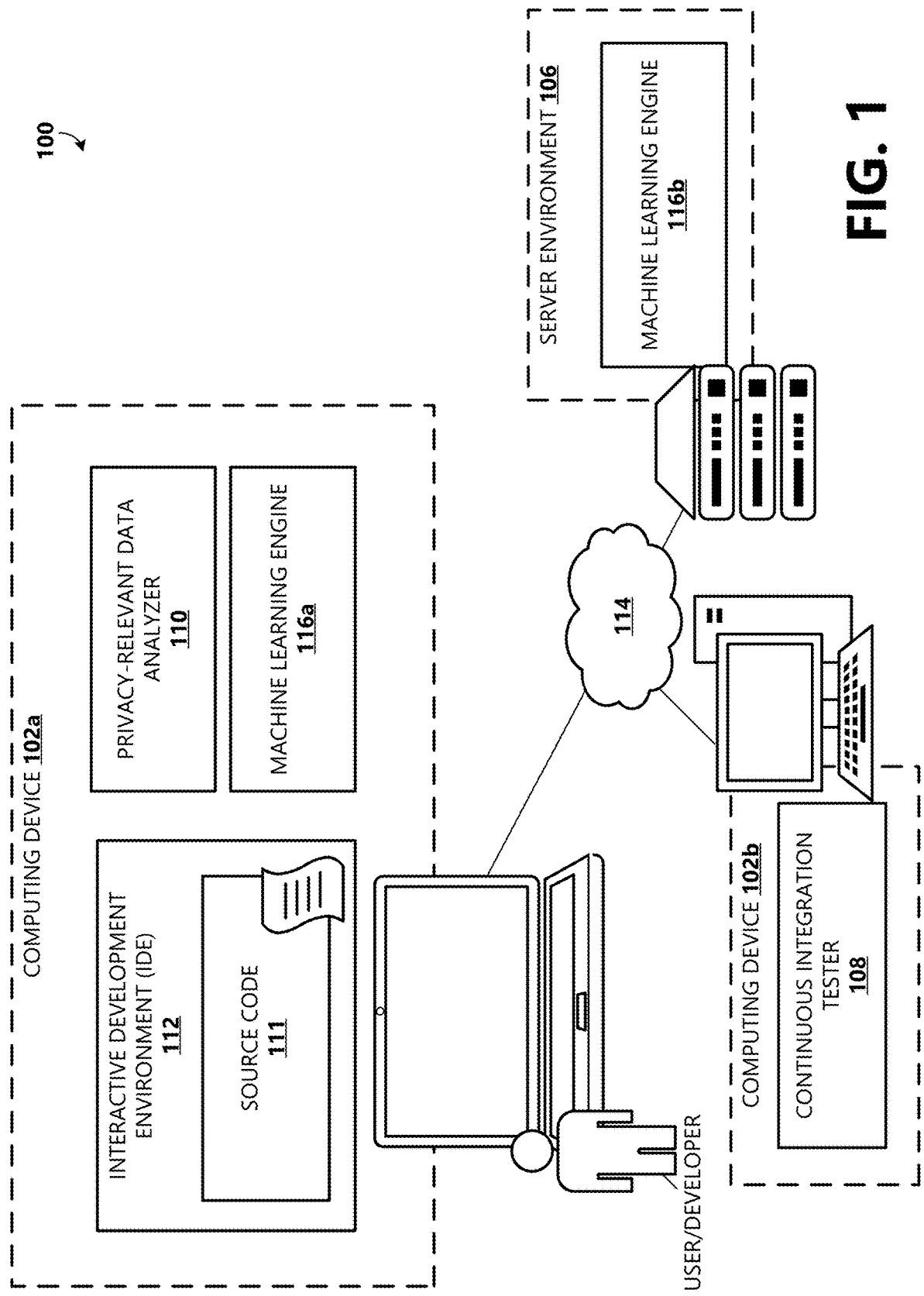
FIG. 1 is a block diagram of a computing system environment for protecting privacy-relevant data according to an example.
Figure 9:
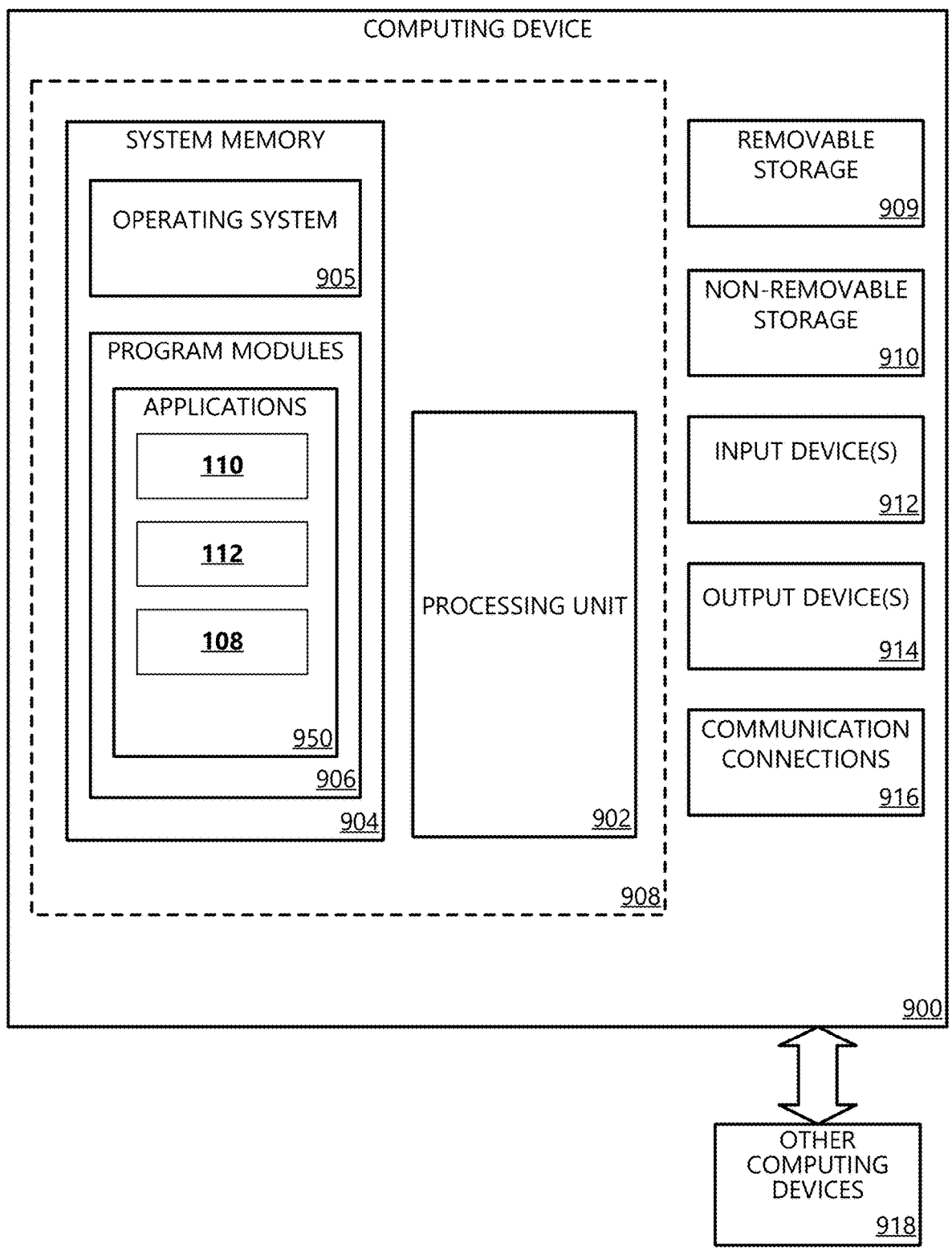
FIG. 9 is a block diagram illustrating example physical components of a computing device with which aspects of the disclosure may be practiced.
Figure 10A:
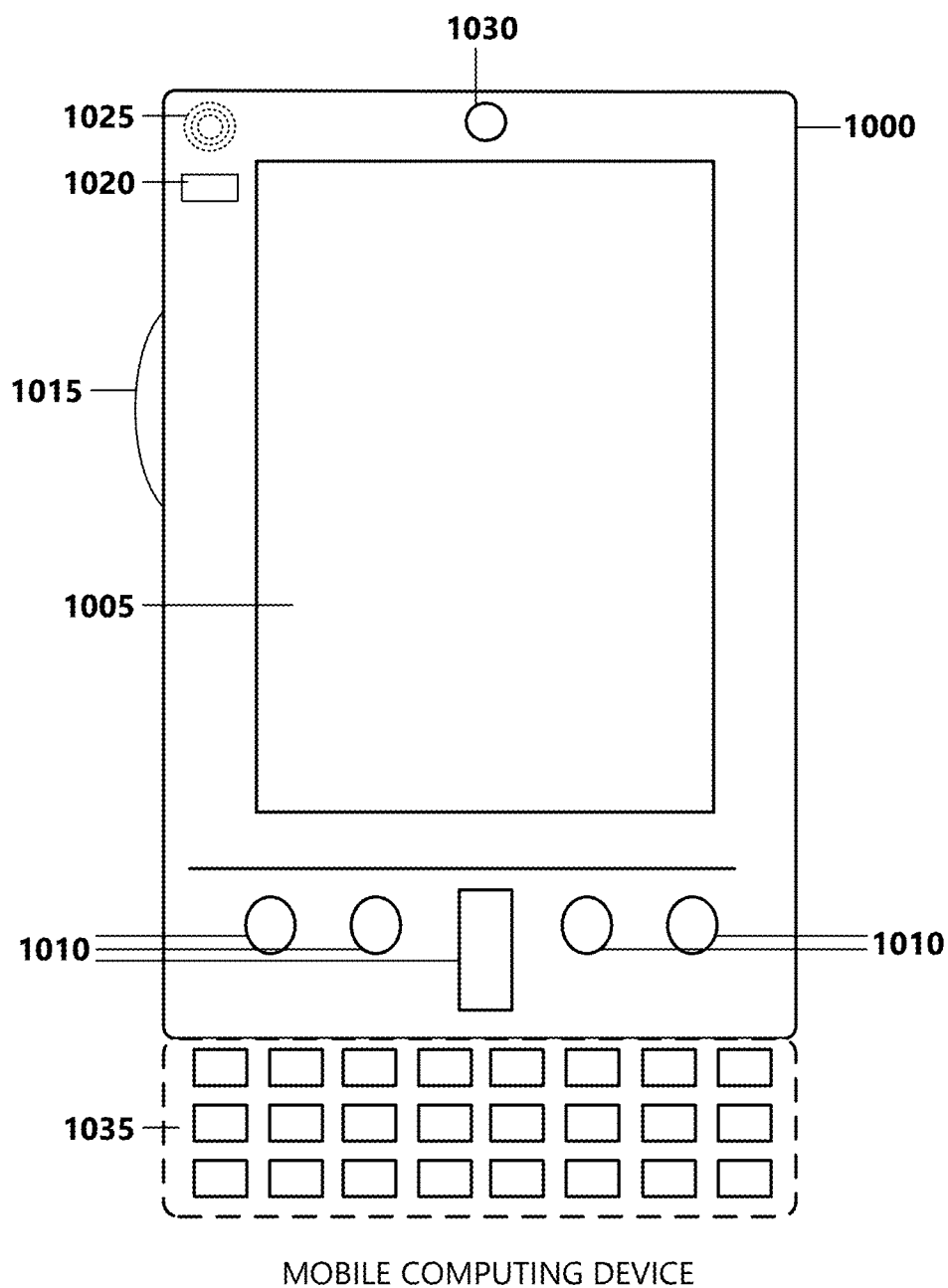
FIGS. 10A and 10B are block diagrams of an example mobile computing device with which aspects of the present disclosure may be practiced.
Figure 10B:
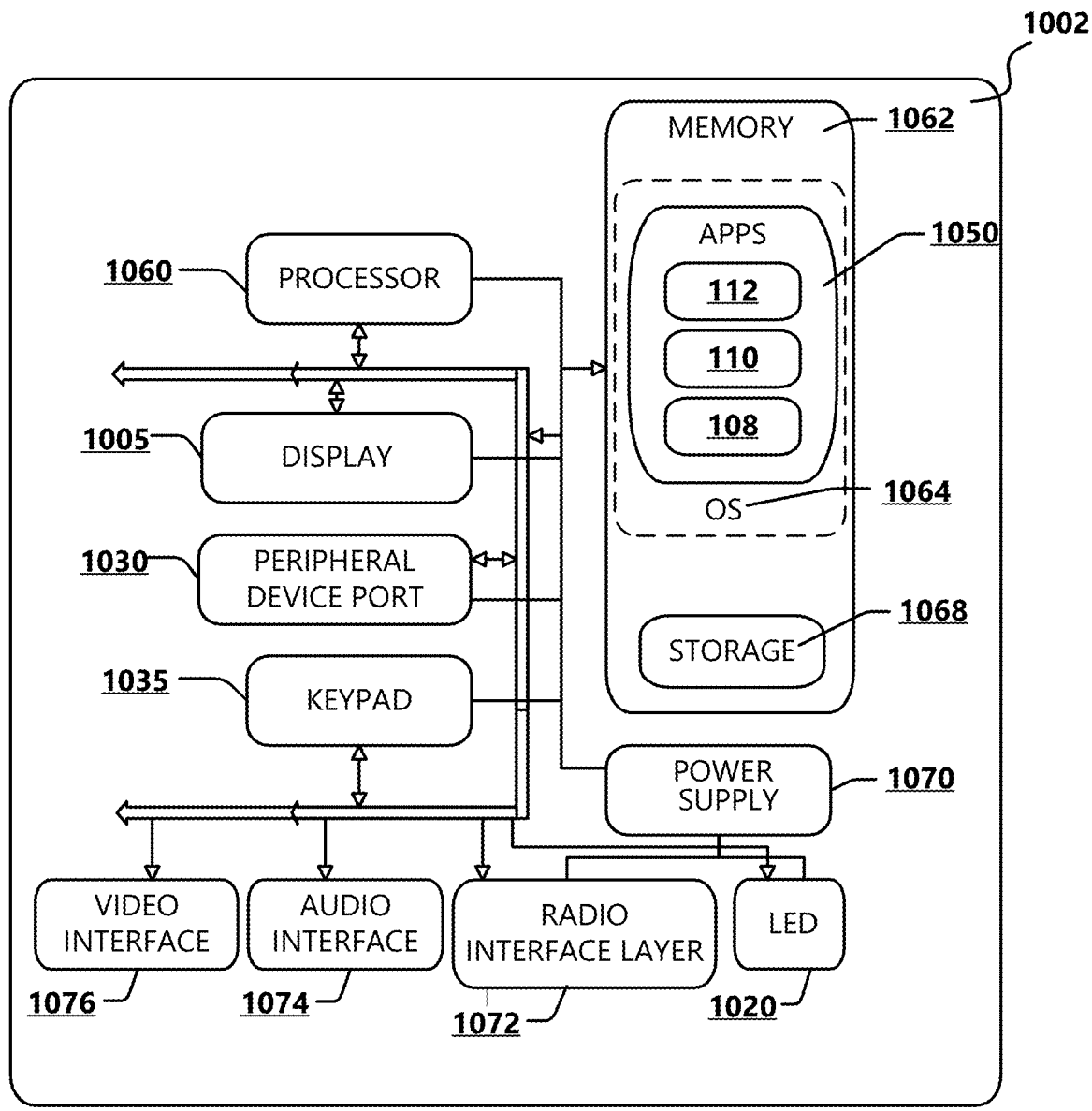

FIG. 1 is a block diagram illustrating an example computing system environment 100 in which a privacy-relevant data analyzer 110 is implemented for protecting the privacy of sensitive data according to examples. The example computing system environment 100 as presented is a combination of interdependent components that interact to form an integrated whole. Components of the computing system environment 100 may be hardware components or software components (e.g., applications, application programming interfaces (APIs), modules, virtual machines, or runtime libraries) implemented on and/or executed by hardware components of the environment 100. In one example, components of systems disclosed herein are implemented on a single processing device. The processing device provides an operating environment for software components to execute and utilize resources or facilities of such a system. An example of processing device(s) comprising such an operating environment is depicted in FIGS. 9, 10A, and 10B. In another example, the components of systems disclosed herein are distributed across multiple processing devices. For instance, input may be entered on a client device and information may be processed on or accessed from other devices in a network, such as one or more remote cloud devices or web server devices.

In FIG. 1, the computing system environment 100 includes one or more general-purpose computing devices 102a, 102b (collectively, computing devices 102). As can be appreciated, the scale and structure of the computing system environment 100 may vary and may include additional or fewer components than those described in FIG. 1. As one example, one or more components included in the computing device(s) 102 may be incorporated into a service environment 106.

According to examples, a first computing device 102a is used by a user, such as a developer. For instance, the user may be a developer who uses an interactive development environment (IDE) 112 operating on the first computing device 102a. The IDE 112 is generally utilized to implement a programming environment that includes various tools to facilitate the development of source code 111 used in programs, applications, and other software solutions. A source code file (referred to herein generally as source code 111) includes a set of instructions that is written in a programming language or a combination of programming languages. Source code 111 typically includes one or more statements, each statement typically including one or more expressions and/or entities. The expression and/or entity in the statement can be made up of multiple components.

The IDE 112 typically enables developers/programmers (herein referred to generally as users) to write and edit source code 111, see errors in code construction or syntax, automate repetitive tasks and the building of code assemblies, browse class structures, compile the source code into target code (e.g., JavaScript, low-level assembly language, binary object code, etc.), and the like. In some examples, the IDE 112 further provides code templates, macros, and other utilities; automatically creates classes, methods, and properties; supports code re-factoring; and supports tools for collaboration among development team members and project management, among other features.

According to an example implementation, the computing system environment 100 further includes a privacy-relevant data analyzer 110. According to examples, the IDE 112 utilizes the privacy-relevant data analyzer 110 to detect privacy-relevant data included in the source code 111. For instance, the privacy-relevant data analyzer 110 evaluates source code 111, detects privacy-relevant data included in the source code 111, and generates a report of detected privacy-relevant data. In some examples, the report is provided to and read by the IDE 112. For instance, the IDE 112 uses the report to notify the user of the detected privacy-relevant data items so that the user can review and resolve the items while the source code 111 is being written.

According to another example implementation, the computing system environment 100 further includes a continuous integration tester 108 that analyzes source code 111, for instance, as part of a code review process when integrating a source code part into a whole source code 111. In some examples, and as depicted in FIG. 1, the continuous integration tester 108 runs on a second computing device 102b. According to examples, the continuous integration tester 108 utilizes the privacy-relevant data analyzer 110 to detect privacy-relevant data included in the source code 111. For instance, the privacy-relevant data analyzer 110 evaluates source code 111 for a current build, detects privacy-relevant data included in the source code 111, and generates a report of detected privacy-relevant data issues. In some examples, the report is provided to and read by the continuous integration tester 108. For instance, the continuous integration tester 108 uses the report to compare against a previous report from a previous build of the source code 111 and fails the current build when new unresolved sensitive data issues are detected. In some examples, the privacy-relevant data analyzer 110 is implemented as an application plugin to the IDE 112 and/or the continuous integration tester 108. In other examples, the privacy-relevant data analyzer 110 is implemented as a stand-alone system. In other examples, the privacy-relevant data analyzer 110 is implemented as a component of the IDE 112.

According to examples, the computing devices 102 detect and/or collect input data from users or user devices. In some examples, the input data corresponds to user interaction with one or more software applications or services implemented by, or accessible to, the computing device 102, such as the IDE 112 or and/or the continuous integration tester 108. In other examples, the input data corresponds to automated interaction with the software applications or services, such as the automatic (e.g., non-manual) execution of scripts or sets of commands at scheduled times or in response to predetermined events. The user interaction or automated interaction may be related to performance of a user activity corresponding to a task, a project, a data request, or the like. The input data may include, for example, audio input, touch input, text-based input, gesture input, and/or image input. The input data may be detected/collected using one or more sensor components of computing devices 102. Examples of sensors include microphones, touch-based sensors, geolocation sensors, accelerometers, optical/magnetic sensors, gyroscopes, keyboards, and pointing/selection tools. Examples of computing devices 102 include a personal computer (PC), mobile device (e.g., smartphone, tablet, laptop, personal digital assistant (PDA), wearable device (e.g., smart watch, smart eyewear, fitness tracker, smart clothing, body-mounted device, head-mounted display), gaming console or device, and an Internet of Things (IoT) device.

According to an example implementation, the computing devices 102 provide the input data to the service environment 106 using a network 114. Examples of the network 114 include a private area network (PAN), a local area network (LAN), a wide area network (WAN), and the like. Although the network 114 is depicted as a single network, it is contemplated that the network 114 may represent several networks of similar or varying types. The service environment 106 provides the computing devices 102 access to various computing services and resources (e.g., applications, devices, storage, processing power, networking, analytics, intelligence). As depicted in FIG. 1, the service environment 106 includes or provides access to one or more machine learning engines 116a, 116b (collectively, machine learning engines 116). For instance, the machine learning engines 116 are implemented in some examples to learn rules for classifying data as privacy relevant. In some implementations, a first machine learning engine 116a runs on the first computing device 102a, providing a fast turnaround in the user's (e.g., developer's) workflow. In some implementations, a second machine learning engine 116b runs on the second computing device 102b (e.g., in a continuous integration/continuous deployment pipeline), providing slower but more thorough machine learning functionalities (e.g., corresponding to the software product being built).

In some example implementations, the service environment 106 is implemented in a cloud-based or server-based environment using one or more computing devices, such as server devices (e.g., web servers, file servers, application servers, database servers), edge computing devices (e.g., routers, switches, firewalls, multiplexers), personal computers (PCs), virtual devices, and mobile devices. Alternatively, the service environment 106 may be implemented in an on-premises environment (e.g., a home or an office) using such computing devices. The computing devices comprise one or more sensor components, as discussed with respect to the computing device 102. The service environment 106 may comprise numerous hardware and/or software components and may be subject to one or more distributed computing models/services (e.g., Infrastructure as a Service (IaaS), Platform as a Service (PaaS), Software as a Service (SaaS), Functions as a Service (FaaS)).

Figure 2:
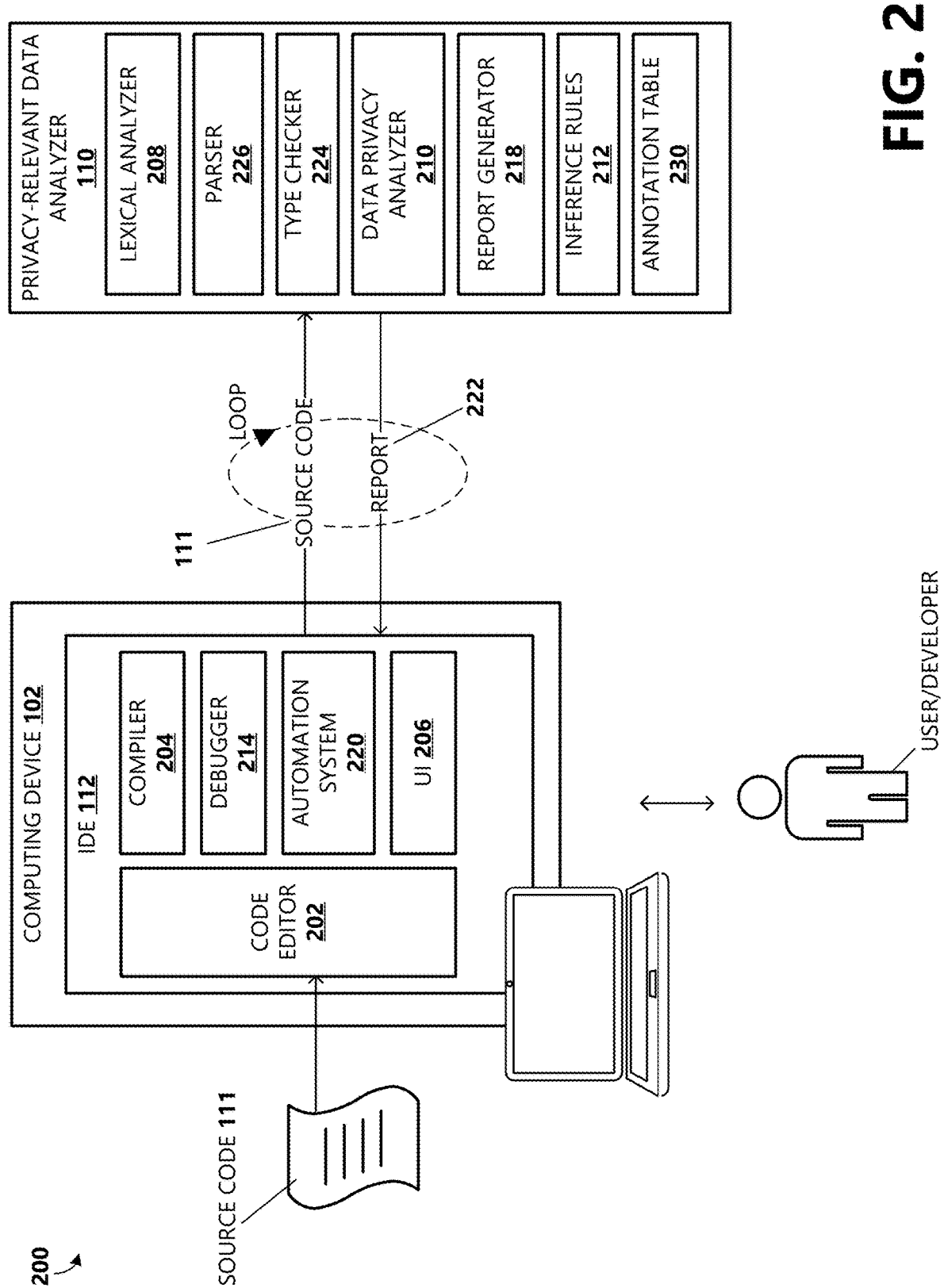
FIG. 2 is functional block diagram of an example computing system environment including a privacy analyzer according to an example.

FIG. 2 is a functional block diagram of an example computing system environment 200 including the IDE 112 and the privacy-relevant data analyzer 110 for providing sensitive data protection in accordance with an embodiment of the present disclosure. The IDE 112 in the illustrated example includes a user interface (UI) 206, which is typically implemented as a graphical user interface or "GUI") that exposes development tools to a user, for example, to enable the user to generate source code 111 in a human-readable computer programming language (e.g., C#, Conceptual schema definition language (CSDL), Visual Basic, .NET programming language). The development tools, for example, may include a code editor 202, a compiler 204, an automation system 220, a debugger 214, and/or other tools.

According to examples, source code 111 is created or modified by the code editor 202, for instance, to develop or update an application. The source code 111 is compiled by the compiler 204 into executable code. In some examples, the compiler 204 is communicatively coupled to the UI 206 to expose errors to the user that may occur during compilation of the source code 111. The code editor 202 is configured to enable source code 111 to be written and edited and will often include features to speed up input of source code, such as syntax highlighting, automated completion, and bracket matching functionality. In some examples, the code editor 202 is further configured to check syntax of the source code 111 on-the-fly as it is typed.

The automation system 220 is configured to automate some of the tasks encountered when developing an application. The automation system 220 may include scripting or other automation tools to automate linking and compiling processes, for example, by performing scripted calls to the compiler 204.

The debugger 214 enables the programmer to observe run-time behavior of an application and locate logical and/or semantic errors in the source code 111. For example, the debugger 214 allows the user to break/suspend execution of the application to examine the source code 111, evaluate and edit variables in the application, view registers and instructions created from the source code 111, and view the memory space used by the application. In some examples, the debugger 214 is configured to work with source code 111 at various stages in development.

According to some examples, the IDE 112 interacts with external data sources that may be needed or helpful for the user to create the desired source code 111. The external data sources, for example, may include files, references, data connections, libraries, and other items.

According to some examples and as shown in FIG. 2, the IDE 112 interacts with the privacy-relevant data analyzer 110. For instance, a request to analyze source code 111 that is being written or edited by the IDE 112 is received by the privacy-relevant data analyzer 110. In some examples, the request corresponds to analyzing a portion of the source code 111, such as an update or local change made to the source code 111. In other examples, the request corresponds to analyzing at least a portion of the source code 111 that includes the update or local change. In response to receiving the request, the privacy-relevant data analyzer 110 evaluates the source code 111 for identifying privacy-relevant data included in the source code 111, generates a report 222 based on the evaluation, and provides the report 222 to the IDE 112. In some examples, the report 222 includes instructions for guiding an interaction with the user to resolve a detected privacy-relevant data issue in the source code 111. In an example, the request for analysis and the response of the report 222 is performed as part of an interaction loop. For instance, the interaction loop is an ongoing loop that takes place while the source code 111 is being written or edited.

In some example implementations, the privacy-relevant data analyzer 110 is implemented as a compiler that includes a variety of functional components including a lexical analyzer 208, a parser 226, a type checker 224, data privacy analyzer 210, and a report generator 218. In some examples, one or more of the components are combined. In some examples, the components are implemented on a single computing device. In other examples, one or a combination of the components are distributed across multiple computing devices.

In some examples, the lexical analyzer 208 converts a stream of characters into a sequence of tokens which are defined, for example, by regular expressions. The parser 226 parses the token sequence to identify a syntactic structure of the application. A parse tree can be constructed to replace the linear structure of the token sequence by application of some formal grammar. For instance, a parse tree is a textual representation of source code 111 in a tree view according to specific language specification. The parse tree represents a given object model for source code 111 and is the basis on which privacy-relevance analysis is performed (e.g., by the data privacy analyzer 210). In some implementations, additional semantic analysis is performed on the parse tree by performing type-checking processes (e.g., by the type checker 224) to add semantic meaning to the parse tree. For instance, semantics is the logic in the source code 111 and all its constructs, which may include declarations of variables, classes, properties, objects, fields, methods, function calls and passing parameters to them, types of operands and operation results, and operator priorities.

The data privacy analyzer 210 uses a set of inference rules 212 to determine whether a data field, record, or combination thereof in the source code 111 includes privacy-relevant data. In some examples, the data privacy analyzer 210 is configured to detect privacy-relevant data in classes, properties, and/or methods included in source code 111.

In some examples, privacy-relevant data is defined to include an annotation of one or more sets of privacy annotations. The one or more sets of privacy annotations may be input into source code 111 to denote whether a field, record, or combination thereof includes privacy-relevant data. In some examples, an annotation is manually added to a datatype in the source code 111. In other examples, an annotation is machine learned and automatically added to the source code 111. Inference rules 212 are used in this example to express various types of guidelines (and/or requirements) to which the source code 111 is desired to adhere and can comprise acceptable types of data the source code 111 can include and/or unacceptable types of data the source code 111 needs to protect (e.g., from disclosure). These can include performance guidelines for a program, design requirements, best practices, enterprise policies (or other types of corporate or company policies), legal guidelines, and regulatory and/or compliance guidelines, and various combinations thereof. In some examples, other types of guidelines may be utilized as may be needed to meet the requirements of a particular implementation. For example, law, regulations, rulings, edicts, or other type of imperatives to which strict adherence is needed can also be incorporated into the inference rules 212. In some examples, the inference rules 212 encode the privacy guideline in a machine understandable format. For instance, the inference rules 212 are used to infer the data classification of a property from its components. As an example, a datatype is marked as containing privacy sensitive information by an inclusion of annotations associated with data classifications of properties of the datatype's components. If an inference rule states that the data classification of a particular property is a highest classification of its components, the datatype is classified as the particular privacy-relevant data.

The report generator 218 generates a report 222 including a list of issues where instances of privacy-relevant data were determined and provides the report 222 to the IDE 112. As mentioned above, in some examples, the report 222 further includes instructions for guiding an interaction with the user to resolve a detected privacy-relevant data issue in the source code 111. For instance, the report 222 is utilized in a feedback loop to ensure that the output of the source code 111 complies with data privacy guidelines. In some examples, the IDE 112 maintains the list using a version control system. In some examples, when an issue is not handled or resolved, the IDE 112 is configured to mark the issue as an error such that the user's attention is directed to the issue.

FIG. 3 shows a source code sample 300 (e.g., of source code 111) that defines a datatype 304 in a formal language according to an example. In the illustrated example, the datatype 304 (e.g., "TodoItemTDO") is a "class" type and includes a first data item 306a (e.g., "Id"—a long integer) and a second data item 306b (e.g., "Name"—a string). In some examples and as shown in FIG. 3, annotations 302a, 302b (collectively, annotations 302) are added to indicate which parts of the datatype 304 are privacy related. For instance, a first annotation 302a (e.g., "EUPI" or "End User Pseudonymous Identifier") is added to the first data item 306a and a second annotation 302b (e.g., "EUII" or "End User Identifiable Information") is added to the second data item 306b. The annotations 302 in this example are included in square brackets. In some examples, the annotations 302 are added to the source code 111 by the IDE 112 in response to manual user input of the annotations 302. The annotations 302 are mapped to the annotation table 230, which includes classifications of data that may be used to adhere to security, compliance, and privacy requirements and processes for collecting, storing, and using user personal information. The annotation table 230, for example, represents a small set of annotative characters or symbols that are easily managed and manipulated as needed.

FIG. 4A is a representation of an example UI 206 as may be displayed during writing or editing source code 111. As depicted, the UI 206 displays a source code sample 400 (e.g., of source code 111) including a method 402 of an application according to an example. For instance, the user may be writing or editing the method 402 using the code editor 202 of the IDE 112. As depicted, the method 402 includes the datatype 304 defined in the source code sample 300 depicted in FIG. 3. For instance, the privacy-relevant data analyzer 110 may determine the method 402 includes an instance where privacy-relevant data may be exposed. In this example, the privacy-relevant data analyzer 110 evaluates the source code sample 400 and determines that the method 402 directly refers to (e.g., returns) the prior-defined datatype 304 that includes privacy-relevant data. According to an example, based on the annotations 302 included in the datatype 304, the privacy-relevant data analyzer 110 identifies the datatype 304 is a violation of a guideline preventing leakage of the prior-defined datatype 304 and binds the datatype 304 as privacy-relevant (e.g., sensitive).

In the other examples, the privacy-relevant data analyzer 110 evaluates the source code sample 400 and determines that the method 402 indirectly refers to the prior-defined datatype 304. For instance, the method 402 may refer to a generic datatype, but may transform or otherwise process privacy-relevant data (e.g., the prior-defined datatype 304) as a result of the execution of the method 402. Accordingly, in some examples, the privacy-relevant data analyzer 110 is configured to use the set of inference rules 212 to infer whether a generic datatype is sensitive (e.g., whether a data field, record, or combination thereof the source code sample 400 includes privacy-relevant data).

FIG. 4B depicts an example notification 404 as may be displayed in the example UI 206 based on an issue included in a report 222. For instance, the UI 206 of the code editor 202 displays at least one line of the source code sample 400 that includes the determined instance of privacy-relevant data (e.g., datatype 304). The UI 206 further displays the notification 404 in association with the privacy-relevant data instance. In some examples, the notification 404 points to or otherwise indicates the at least one line of the source code sample 400 that generated the issue and may include information about the issue and possible actions 406a, 406b (collectively, actions 406) that may be taken to resolve or otherwise address or act on the issue. For instance, as can be seen in the example depicted in FIG. 4B, the endpoint is annotated with a "HttpGet" tag, and a comment describing the annotated element as an "endpoint" for an incoming HTTP request. Thus, the functionality exposed by the method 402, is determined by inference to expose privacy sensitive information. The method 402, by declaration, is exposing the privacy sensitive information through an external HTTP interface; therefore, the method 402 is a point in the source code 111 where privacy sensitive information is being exposed outside of the system and, thus, represents an endpoint that requires special privacy review. As an example, a first action 406*a* may be selected to mark the method 402 as requiring special privacy review and a second action 406*b* may be selected to suppress or configure the issue. For example, when an action 406 is selected, a corresponding action to be performed is launched.

FIG. 4C depicts an example comment 408 as may be displayed in the example UI 206 based on a selection of the first action 406*a* included in the notification 404. For instance, in response to receiving a selection to mark the method 402 as requiring special privacy review, the IDE 112 instructs the code editor 202 to insert the comment 408 into the source code 111. As an example, the comment 408 may include information about the issue, a link for additional information or resources, etc.

FIG. 4D depicts example sub-actions 410*a*, 410*b* (collectively, sub-actions 410) as may be displayed in the example UI 206 based on a selection of the second action 406*b* included in the notification 404 depicted in FIG. 4B. For instance, in response to receiving a selection to suppress or configure the issue, one or more sub-actions 410 are presented in the UI 206, such as a first sub-action 410*a* that may be selected to suppress the issue in the source code 111 and a second sub-action 410*b* that may be selected to configure the severity for the privacy-relevant data analyzer 110. As shown, the user selects the first sub-action 410*a*, and with reference now to FIG. 4E, an example justification 412 is depicted as may be added to the source code 111 and displayed in the example UI 206 based on a selection of the first sub-action 410*a*. For instance, when a selection is made to suppress the issue, an annotation or assembly decorator is generated. In some examples, the user is prompted to enter a justification 412 for the selection to suppress the notification, which is included in the annotation and displayed in the UI 206. In other examples, the justification 412 is included in a same or separate file, stored, and is tracked (e.g., using a source control system). According to examples, the IDE 112 tracks issues that need to be reviewed. In some examples, when an issue is suppressed and not resolved, the IDE 112 tracks the issue as an error in the source code 111.

Figure 5:
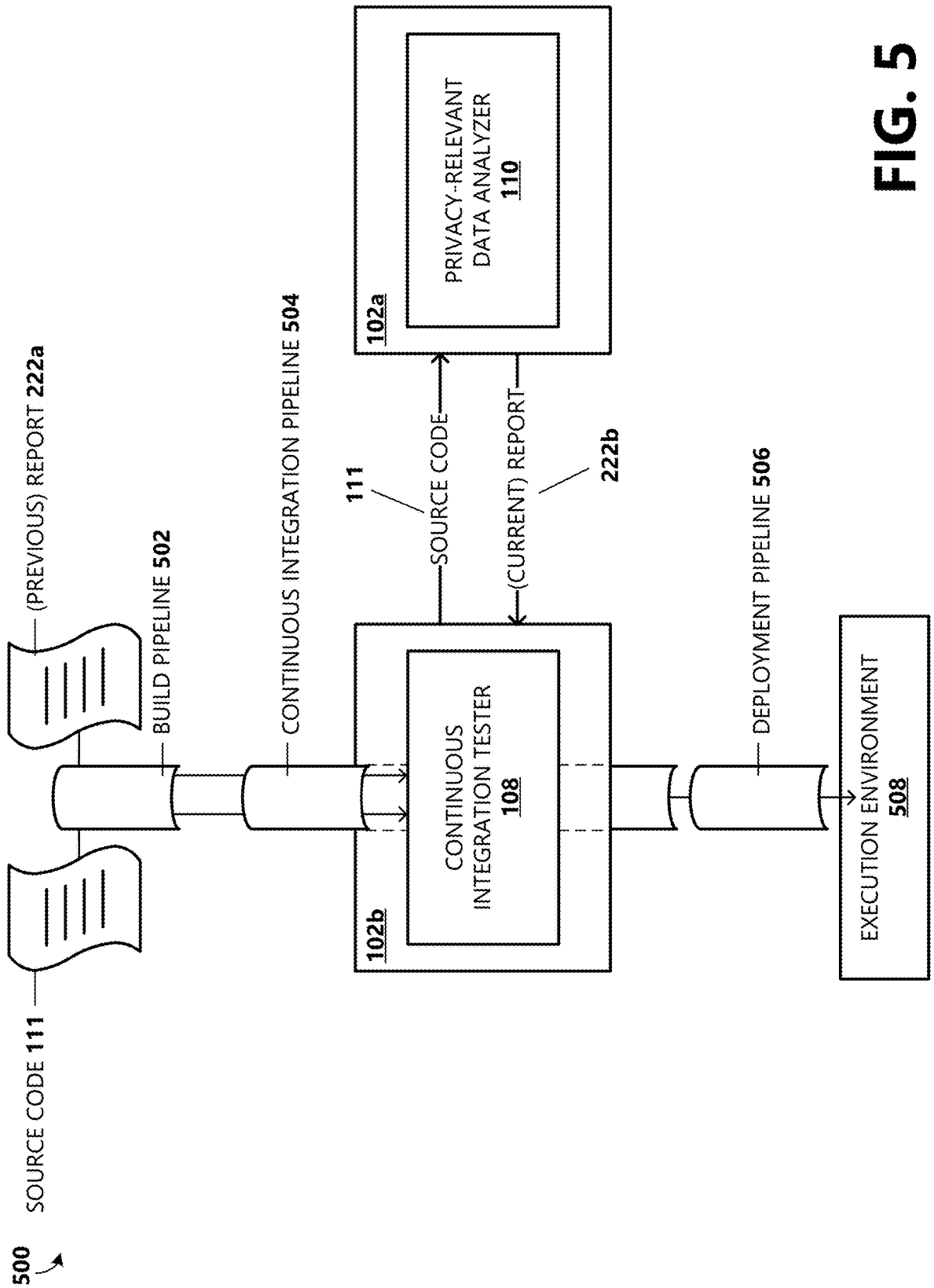
FIG. 5 is a functional block diagram of an example computing system environment including a privacy analyzer according to an example.

FIG. 5 is a functional block diagram of an example computing system environment 500 including the privacy-relevant data analyzer 110 and the continuous integration tester 108 for providing sensitive data privacy protection in accordance with another embodiment of the present disclosure. For instance, the example computing system environment 200 described above with reference to FIG. 2 may operate to perform operations in a build pipeline 502, where the example computing system environment 500 with reference to FIG. 5 may operate to perform operations in a continuous integration pipeline 504. In the continuous integration pipeline 504, for example, the continuous integration tester 108 takes artifacts generated in the build pipeline 502 (e.g., the source code 111 and a previous report 222*a* from a previous build) and tests the source code 111 before sending passing source code 111 (e.g., source code that passes the test) to an execution environment 508 (e.g., a substrate or other execution environment). In some examples, when source code 111 fails the test, the continuous integration tester 108 fails the current build. For instance, an application typically evolves in stages, where different stages of the source code 111 are ongoingly deployed (e.g., later a same day, a next day, a next week, a next year). Accordingly, each new version of the source code 111 that is being deployed is tested by the continuous integration tester 108. As such, in some examples, the continuous integration tester 108 requests source code 111 that is being written or edited by a user. Additionally, the continuous integration tester 108 requests the previous report 222*a* from the previous build or deployment of the source code 111. For instance, the continuous integration tester 108 uses the previous report 222*a* to find differences between old and new source code 111. In some examples, the continuous integration tester 108 runs compilation and static analyses of source code 111 as a batch job.

In some examples, a request to analyze source code 111 in the continuous integration pipeline 504 is received by the privacy-relevant data analyzer 110 (from the continuous integration tester 108) in association with a current build. In some examples, the request corresponds to analyzing a portion of the source code 111, such as an update or local change made to the source code 111 in the current build. In other examples, the request corresponds to analyzing at least a portion of the source code 111 that includes the update or local change. In response to receiving the request, the privacy-relevant data analyzer 110 evaluates the source code 111 for identifying privacy-relevant data included in the source code 111, generates a report (e.g., a current report 222*b*) based on the evaluation, and provides the current report 222*b* to the continuous integration tester 108. In some examples, the continuous integration tester 108 compares the current report 222*b* to the previous report 222*a* for determining whether there are new or unresolved sensitive data issues in the current report 222*b*. In some examples, when the continuous integration tester 108 detects that a privacy-relevant data issue is not resolved, the continuous integration tester 108 fails the current build so that the privacy-relevant data issue is not promoted into any kind of further integration. For instance, if a privacy-relevant data issue is not explicitly resolved, a link between the continuous integration pipeline 504 and continuous deployment pipeline 506 is broken and the source code 111 is not promoted into production status.

Figure 6:
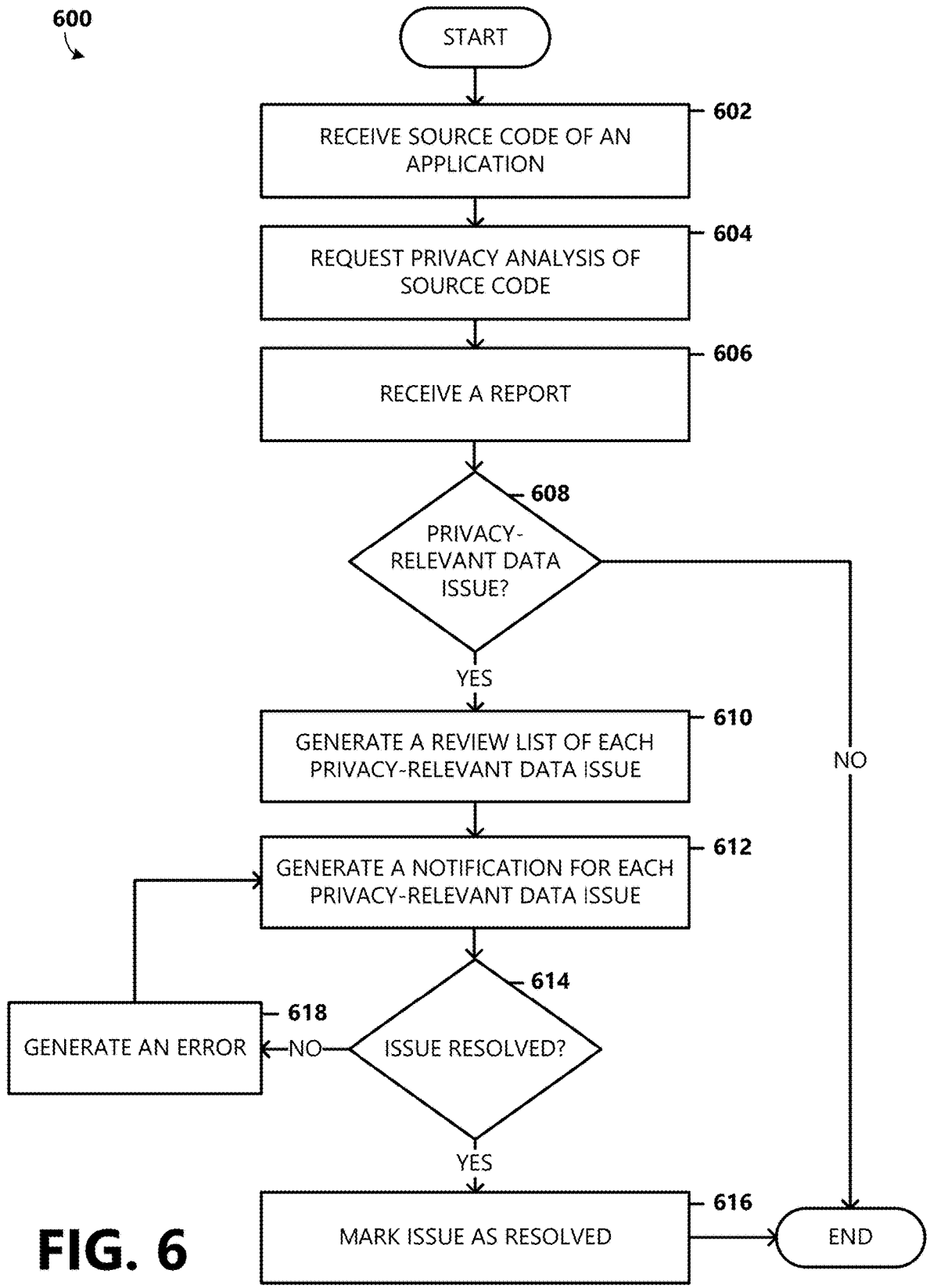
FIG. 6 is a flowchart depicting operations of a method for protecting sensitive data according to an example.

FIG. 6 is a flowchart depicting a method 600 for protecting sensitive data according to an example. For instance, one or more operations of the method 600 are performed by the IDE 112 as part of protecting sensitive data. With reference now to FIG. 6, the method 600 starts when source code 111 being written or edited is received by the IDE 112. For instance, a user may be writing or editing source code 111 of an application during in a build pipeline 502 of a development process. In some examples, the source code 111 is a first version of source code 111. In other examples, the source code 111 is an iterative version of source code 111.

At operation 604, the IDE 112 requests data privacy analysis of at least a portion of the source code 111 including an update or local change made to the source code 111 by the user. For example, the IDE 112 requests the privacy-relevant data analyzer 110 to evaluate the source code 111 for determining whether the update or local change exposes sensitive data. In some examples, the privacy-relevant data analyzer 110 performs one or more operations of a method 800 depicted in FIG. 8 and described below for protecting sensitive data according to an example.

At operation 606, a report 222 is received from the privacy-relevant data analyzer 110 in association with the evaluation. At decision operation 608, a determination is made as to whether the report 222 includes any privacy-relevant data issues corresponding to one or more instances of detected privacy-relevant data in the source code update or local change. When a privacy-relevant data issue is included in the report 222, a review list is generated at operation 610 to track each privacy-relevant data issue, such as whether the issue has been reviewed, resolved, suppressed, etc.

At operation 612, a notification 404 is generated for display in a UI 206 in association with the privacy-relevant data instance. In some examples, the notification 404 points to or otherwise indicates a datatype 304 that generated the issue and may include information about the issue and possible actions 406 that may be taken to resolve or otherwise address the issue.

At decision operation 614, a determination is made as to whether the issue has been resolved. For instance, the issue is marked as resolved at operation 616 when an action 406 selected by the user that causes the issue to be reviewed is explicitly resolved. Alternatively, when the issue is not resolved, an error is generated at operation 618 in the source code 111. In some examples, the method 600 returns to operation 612, where a notification of the issue is generated and displayed to the user. For instance, the user may then be able to resolve or otherwise address the issue.

Figure 7:
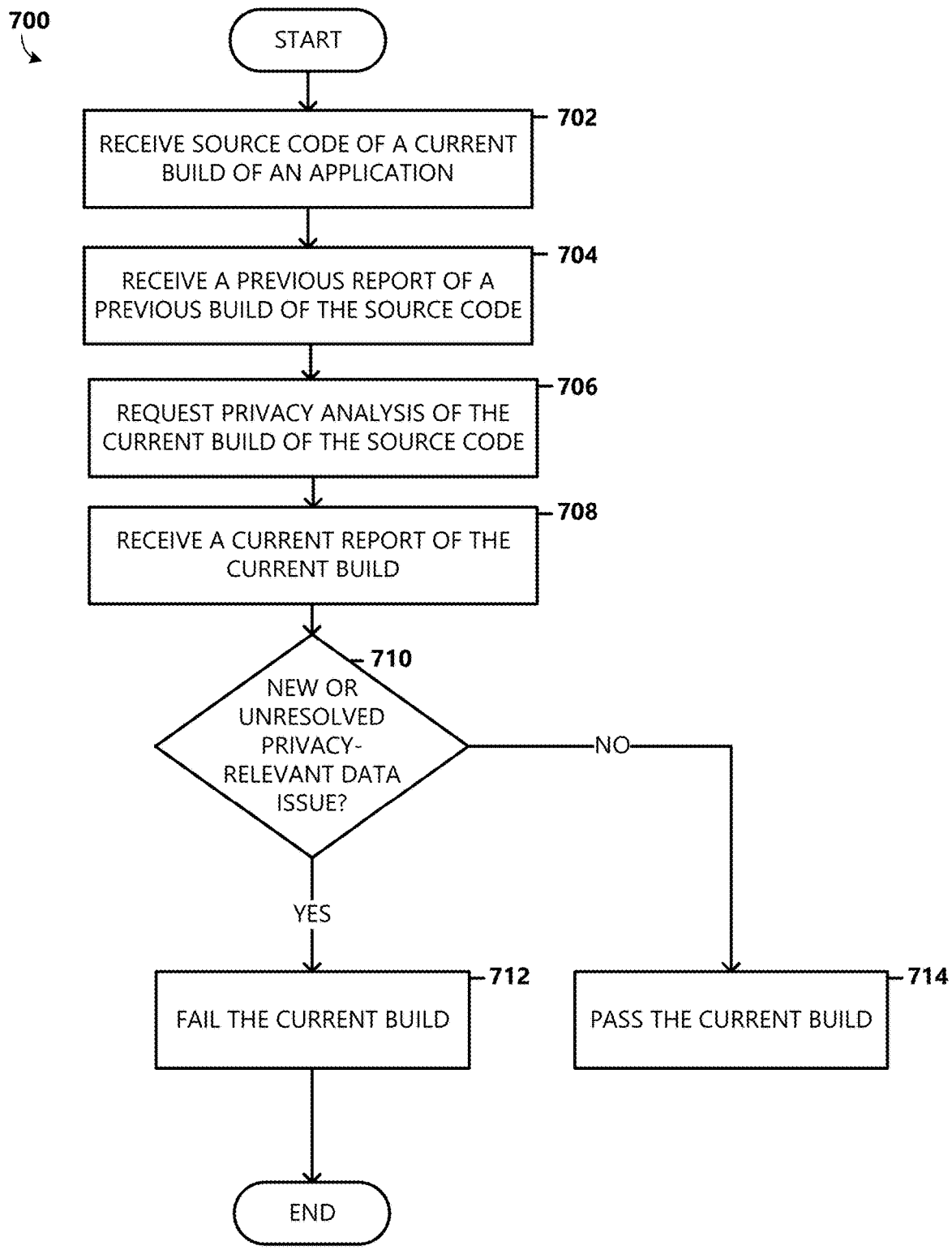
FIG. 7 is a flowchart depicting operations of another method for protecting sensitive data according to an example.

FIG. 7 is a flowchart depicting a method 700 for protecting sensitive data according to an example. For instance, one or more operations of the method 700 are performed by the continuous integration tester 108 as part of protecting sensitive data. With reference now to FIG. 7, the method 700 starts at operation 702 when source code 111 of a current build of an application is received by the continuous integration tester 108 as part of a continuous integration pipeline 504. For instance, the current build includes an update made to the source code 111 of the application from a previous build.

At operation 704, the continuous integration tester 108 requests and receives a previous privacy report 222a of the previous build of the source code 111.

At operation 706, the continuous integration tester 108 requests data privacy analysis of at least a portion of the source code 111 including the update or local change made to the source code 111 by the user. For example, the continuous integration tester 108 requests the privacy-relevant data analyzer 110 to evaluate the source code 111 for determining whether the update or local change exposes sensitive data. In some examples, the privacy-relevant data analyzer 110 performs one or more operations of a method 800 depicted in FIG. 8 and described below for protecting sensitive data according to an example.

At operation 708, a current report 222b is received from the privacy-relevant data analyzer 110 in association with the evaluation. At decision operation 710, the privacy-relevant data analyzer 110 compares the current report 222b and the previous report 222a and determines whether the current report 222b includes any unresolved or new privacy-relevant data issues. For example, the unresolved or new privacy-relevant data issues may correspond to one or more instances of detected privacy-relevant data in the source code update or local change. In some examples, when a new or unresolved privacy-relevant data issue is determined, the privacy-relevant data analyzer 110 fails the current build at operation 712. In some examples, the privacy-relevant data analyzer 110 generates a justification for the failed build. The justification may include an indication of the unresolved or new privacy-relevant data issue. In other examples, when no new or unresolved privacy-relevant data issues are determined at decision operation 710, the privacy-relevant data analyzer 110 passes the current build at operation 714.

Figure 8:
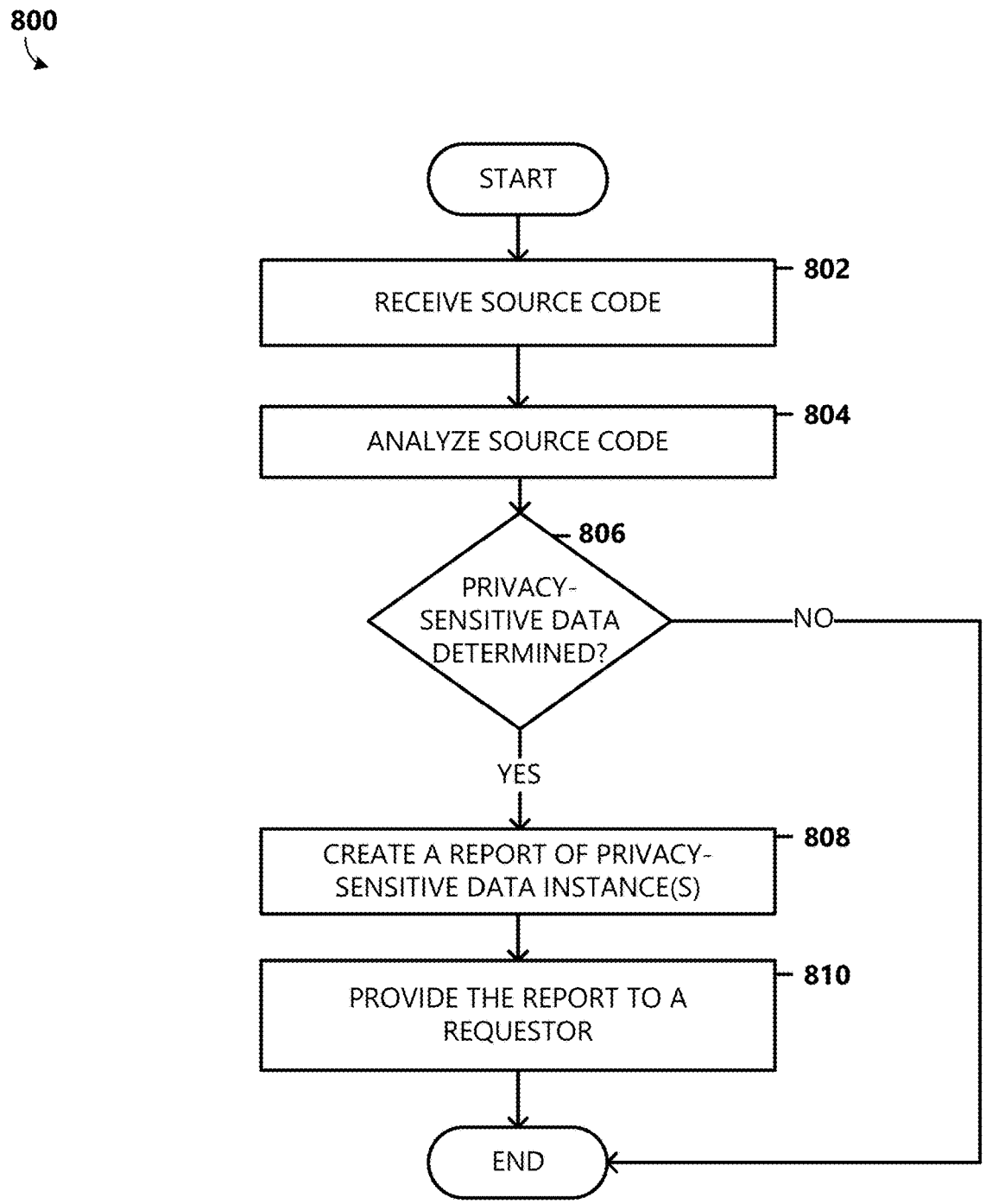
FIG. 8 is a flowchart depicting operations of another method for protecting sensitive data according to an example.

FIG. 8 is a flowchart depicting a method 700 for protecting sensitive data according to an example. For instance, one or more operations of the method 800 are performed by the privacy-relevant data analyzer 110. In some examples, the method 800 is performed during a build pipeline 502 of development of an application. In other examples, the method 800 is performed during a continuous integration pipeline 504 of the development process.

At operation 802, at least a portion of source code 111 that includes an update or local change is received in a request for privacy analysis. In response to receiving the request, the privacy-relevant data analyzer 110 analyzes the source code 111 at operation 804 for identifying privacy-relevant data included in the source code 111. In some examples, the privacy-relevant data analyzer 110 generates a parse tree representing the source code 111 and performs an analysis of the parse tree for determining whether the source code 111 includes privacy-relevant data. For instance, the privacy-relevant data analyzer 110 performs a traversal of the parse tree to determine whether the source code 111 includes privacy-relevant data classifications.

At decision operation 806, the privacy-relevant data analyzer 110 determines whether the source code 111 includes privacy-relevant data. In some examples, the determination is based on whether the parse tree includes a direct reference to a datatype 304 including an annotation 302 mapped to annotation table 230 including classifications of data and their associated annotations 302 that may be used to adhere to security, compliance, and privacy requirements and processes for collecting, storing, and using user personal information. In other examples, the determination is made based on inferred whether a datatype 304 referred to in a method 402 includes privacy-relevant data. The inference, for example, may be made based on a set of inference rules 212. As an example, a parameter to a certain logging function is defined to only accept data with certain classifications, (e.g., "System Metadata", which is not sensitive). For a variable/function which is not explicitly annotated with a classification, the variable will receive the sum of all classifications it had as input (i.e., a worst-case interpretation). Thus, if any data is sent (e.g., transitively) classified as private in that parameter, the privacy-relevant data analyzer 110 determines this as breaking the rule and triggering an error.

When a determination is made that the source code 111 includes privacy-relevant data, the privacy-relevant data analyzer 110 generates a report 222 at operation 808. According to examples, the report 222 includes an information about one or more privacy-relevant issues corresponding to one or more instances of privacy-relevant data included in the source code as determined by the privacy-relevant data analyzer 110.

At operation 810, the privacy-relevant data analyzer 110 provides the report 222 to a requestor. For example, when the method 800 is performed during the build pipeline 502 of the application, the privacy-relevant data analyzer 110 provides the report 222 to the IDE 112. Or, when the method 800 is performed during the continuous integration pipeline 504 of the development process of the application, the privacy-relevant data analyzer 110 provides the report 222 to the continuous integration tester 108.

FIGS. 9, 10A, and 10B and the associated descriptions provide a discussion of a variety of operating environments in which examples of the disclosure may be practiced. However, the devices and systems illustrated and discussed with respect to FIGS. 9, 10A, and 10B are for purposes of example and illustration, a vast number of computing device configurations that may be utilized for practicing aspects of the disclosure, described herein.

FIG. 9 is a block diagram illustrating physical components (e.g., hardware) of a computing device 900 with which examples of the present disclosure may be practiced. The computing device components described below may be suitable for one or more of the components of the system 100 described above. In a basic configuration, the computing device 900 includes at least one processing unit 902 and a system memory 904. Depending on the configuration and type of computing device 900, the system memory 904 may comprise volatile storage (e.g., random access memory), non-volatile storage (e.g., read-only memory), flash memory, or any combination of such memories. The system memory 904 may include an operating system 905 and one or more program modules 906 suitable for running software applications 950, such as the IDE 112, privacy-relevant data analyzer 110, continuous integration tester 108, and other applications.

The operating system 905 may be suitable for controlling the operation of the computing device 900. Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 may perform processes including one or more of the stages of methods 600, 700, and/or 800 illustrated in FIG. 5, FIG. 6, and/or FIG. 8, respectively. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing spatial-textual clustering-based predictive recognition of text in a video may be operated via application-specific logic integrated with other components of the computing device 900 on the single integrated circuit (chip). Examples of the present disclosure may also be practiced using other technologies capable of performing logical operations such as, for example, AND, OR, and NOT, including mechanical, optical, fluidic, and quantum technologies.

The computing device 900 may also have one or more input device(s) 912 such as a keyboard, a mouse, a pen, a sound input device, a touch input device, a camera, etc. The output device(s) 914 such as a display, speakers, a printer, etc. may also be included. The aforementioned devices are examples and others may be used. The computing device 900 may include one or more communication connections 916 allowing communications with other computing devices 918. Examples of suitable communication connections 916 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 904, the removable storage device 909, and the non-removable storage device 910 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer readable media may be part of the computing device 900. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

FIGS. 10A and 10B illustrate a mobile computing device 1000, for example, a mobile telephone, a smart phone, a tablet personal computer, a laptop computer, and the like, with which aspects of the disclosure may be practiced. With reference to FIG. 10A, an example of a mobile computing device 1000 for implementing at least some aspects of the present technology is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative examples, mobile computing device 1000 may incorporate more or less input elements. For example, the display 1005 may not be a touch screen in some examples. In alternative examples, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various aspects, the output elements include the display 1005 for showing a graphical user interface (GUI), a visual indicator 1020 (e.g., a light emitting diode), and/or an audio transducer 1025 (e.g., a speaker). In some examples, the mobile computing device 1000 incorporates a vibration transducer for providing the user with tactile feedback. In yet another example, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one example of a mobile computing device. That is, the mobile computing device 1000 can incorporate a system (e.g., an architecture) 1002 to implement some examples. In one example, the system 1002 is implemented as a "smart phone" capable of running one or more applications (e.g., videoconference or virtual meeting application, browser, e-mail, calendaring, contact managers, messaging clients, games, and media clients/players). In some examples, the system 1002 is integrated as a computing device, such as an integrated personal digital assistant (PDA) and wireless phone.

One or more application programs 1050 (e.g., one or more of the components of system 100) may be loaded into the memory 1062 and run on or in association with the operating system 1064, such as the IDE 112, privacy-relevant data analyzer 110, continuous integration tester 108, and/or other applications. Other examples of the application programs 1050 include videoconference or virtual meeting programs, phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1050 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at a remote device or server. As should be appreciated, other applications may be loaded into the memory 1062 and run on the mobile computing device 1000.

The system 1002 has a power supply 1070, which may be implemented as one or more batteries. The power supply 1070 might further include an external power source, such as an AC adapter or a powered docking cradle that supplements or recharges the batteries.

The system 1002 may also include a radio 1072 that performs the function of transmitting and receiving radio frequency (RF) communications. The radio 1072 facilitates wireless connectivity between the system 1002 and the "outside world," via a communications carrier or service provider. Transmissions to and from the radio 1072 are conducted under control of the operating system 1064. In other words, communications received by the radio 1072 may be disseminated to the application programs 1050 via the operating system 1064, and vice versa.

The visual indicator 1020 (e.g., light emitting diode (LED)) may be used to provide visual notifications and/or an audio interface 1074 may be used for producing audible notifications via the audio transducer 1025. In the illustrated example, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. The system 1002 may further include a video interface 1076 that enables an operation of a peripheral device port 1030 (e.g., an on-board camera) to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio 1072 or via a distributed computing network. Similarly, such data/information may be readily transferred between computing devices for storage and use according to well-known data/information transfer and storage means, including electronic mail and collaborative data/information sharing systems.

Examples include a computer-implemented method for protecting sensitive data, comprising: receiving a request from a requestor to analyze source code of an application during development of the application; analyzing the source code for privacy relevant data based on a set of inference rules; determining an instance of privacy related data corresponding to an annotation included in the source code; generating a report including an indication of a privacy issue corresponding to the instance of privacy related data; and providing the report to the requestor for providing a notification of the privacy issue.

Examples include a system, the system comprising at least one processor; and memory storing instructions that, when executed by the at least one processor cause the system to: receive an update to source code of an application during development of the application; analyze the source code for privacy relevant data based on a set of inference rules; determine one or more instances of privacy related data corresponding to one or more annotations included in the source code; generate a first report including an indication of one or more privacy issues corresponding to the one or more instances of privacy related data; and generate a notification for each of the one or more privacy issues in the first report that each privacy issue should be reviewed.

Examples include a system comprising: at least one processor; and memory storing instructions that, when executed by the at least one processor cause the system to: receive an update to source code of an application during development of the application; analyze the source code for privacy relevant data based on a set of inference rules; determine one or more instances of privacy related data corresponding to one or more annotations included in the source code; generate a first report including an indication of one or more privacy issues corresponding to the one or more instances of privacy related data; and generate a notification for each of the one or more privacy issues in the first report that each privacy issue should be reviewed.

The methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

Furthermore, boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method for protecting sensitive data, comprising:
   receiving a request from a requestor to analyze source code of an application during development of the application;
   analyzing the source code for privacy relevant data based on a set of inference rules;
   determining an instance of privacy related data corresponding to an annotation included in the source code, wherein the annotation is mapped to an annotation table comprising a mapping of the annotation to a privacy relevant data classification, and wherein the instance of privacy related data is determined based on the privacy relevant data classification;
   generating a report including an indication of a privacy issue corresponding to the instance of privacy related data; and
   providing the report to the requestor for providing a notification of the privacy issue.

2. The method of claim 1, wherein providing the report to the requestor comprises:
   including, in the report, information corresponding to the instance of privacy related data; and
   providing the report to an interactive development environment (IDE) during a build pipeline of the development of the application.

3. The method of claim 2, wherein providing the report comprises including instructions for generating a notification notifying a user of the privacy issue.

4. The method of claim 1, wherein providing the report to the requestor comprises:
   including, in the report, information corresponding to a new or unresolved privacy related data; and
   providing the report to a continuous integration tester during a continuous integration pipeline of the development of the application for failing a current build based on the new or unresolved privacy related data.

5. The method of claim 1, wherein analyzing the source code for privacy relevant data comprises using one or more inference rules defining privacy-relevant data.

6. The method of claim 1, wherein analyzing the source code for privacy relevant data comprises determining whether the source code includes a class, property, or method that refers to a datatype including the annotation.

7. A system comprising:
   at least one processor; and
   memory storing instructions that, when executed by the at least one processor cause the system to:
   receive a request from a requestor to analyze source code of an application during development of the application;
   analyze the source code for privacy relevant data based on a set of inference rules;

determine an instance of privacy related data corresponding to an annotation included in the source code, wherein the annotation is mapped to an annotation table comprising a mapping of the annotation to a privacy relevant data classification, and wherein the instance of privacy related data is determined based on the privacy relevant data classification;

generate a report including an indication of a privacy issue corresponding to the instance of privacy related data; and provide the report to the requestor for providing a notification of the privacy issue.

8. The system of claim 7, wherein the instructions cause the system to:

include, in the report, information corresponding to the instance of privacy related data; and provide the report to an interactive development environment (IDE) during a build pipeline of the development of the application.

9. The system of claim 8, wherein the instructions cause the system to include, in the report, instructions for generating a notification notifying a user of the privacy issue.

10. The system of claim 7, wherein the instructions cause the system to:

include, in the report, information corresponding to a new or unresolved privacy related data; and provide the report to a continuous integration tester during a continuous integration pipeline of the development of the application for failing a current build based on the new or unresolved privacy related data.

11. The system of claim 7, wherein in analyzing the source code, the instructions cause the system to use one or more inference rules defining privacy-relevant data to determine a class, property, or method refers to a datatype including the annotation.

12. The system of claim 11, wherein the annotation is manually added to the datatype.

13. The system of claim 11, wherein the annotation is machine learned and automatically added to the datatype.

14. A system comprising:

at least one processor; and memory storing instructions that, when executed by the at least one processor cause the system to:

receive an update to source code of an application during development of the application;

analyze the source code for privacy relevant data based on a set of inference rules;

determine one or more instances of privacy related data corresponding to one or more annotations included in the source code, wherein the annotation is mapped to an annotation table comprising a mapping of the one or more annotations to a privacy relevant data classification, and wherein the instance of privacy related data is determined based on the privacy relevant data classification;

generate a first report including an indication of one or more privacy issues corresponding to the one or more instances of privacy related data; and generate a notification for each of the one or more privacy issues in the first report that each privacy issue should be reviewed.

15. The system of claim 14, wherein in analyzing the source code, the instructions cause the system to use one or more inference rules defining privacy-relevant data to determine a class, property, or method refers to a datatype including an annotation of the one or more annotations.

16. The system of claim 15, wherein the annotation of the one or more annotations is manually added to the datatype.

17. The system of claim 15, wherein the annotation of the one or more annotations is machine learned and automatically added to the datatype.

18. The system of claim 14, wherein the instructions cause the system to:

determine at least one of the one or more privacy issues in the first report is unresolved; and generate an error corresponding to the at least one unresolved privacy issue.

19. The system of claim 14, wherein the instructions cause the system to:

test the source code before sending the source code to an execution environment;

analyze the source code for new or unresolved privacy relevant data based on a set of inference rules;

determine one or more instances of new or unresolved privacy related data corresponding to one or more annotations included in the source code;

generate a second report including an indication of one or more privacy issues corresponding to the one or more instances of new or unresolved privacy related data; and fail the source code and prevent the source code from being sent to the execution environment.

20. The system of claim 19, wherein in determining one or more instances of new or unresolved privacy related data, the instructions cause the system to compare the second report to the first report for identifying the one or more instances of new or unresolved privacy related data.

\* \* \* \* \*